UNITED STATES PATENT OFFICE 2,373,603

PROTEINACEOUS WETTING AGENTS AND
PROCESS OF MAKING THEM

John B. Rust, West Orange, and Leonard Spialter, Irvington, N. J., assignors to Montclair Research Corporation, a corporation of New Jersey No Drawing. Application June 9, 1944,
Serial No. 539,603

5 Claims. (Cl. 260—112)

This invention relates to surface-active substances prepared from partly degraded proteinaceous materials.

An object of the invention is the preparation of surface-active agents from naturally occurring protein materials such as gelatin, zein, soya bean meal, blood albumin, egg albumin and other proteins of animal or vegetable origin. A further object is the preparation of wetting agents from scrap protein materials such as fish scrap, leather scrap, silk waste, dried blood, horn, hair, feathers, etc. Another object is the preparation of the agents by an economical process involving a simple procedure with simple apparatus. Other objects will appear hereinafter.

Protein materials may be split by treatment with acid or basic solutions. It is possible to control the cleavage so that a partly degraded product may be obtained. For example, a high molecular weight water-soluble material may be obtained by boiling protein material with dilute sodium hydroxide solution for about 5-30 minutes or longer. Products so obtained have little or no value as wetting agents since they are for the most part hydrophilic substances. The introduction of lyophilic radicals into the degraded protein molecules produces products that show good detergent action. Since the degraded protein molecules contain some free amino groups, it is a relatively simple matter to introduce a lyophilic radical by treating the protein material with a compound or mixture of compounds known to react with free amino groups. We have obtained improved products by treating the degraded protein materials with alkaryl sulfonyl halides, where the alkyl group possesses more than three carbon atoms. Although a reagent as simple as paratoluene sulfonyl chloride may be reacted, unsatisfactory results are obtained as regards surface-active properties. We have found that the side chain attached to the aromatic nucleus should contain 4 or more carbons.

The alkaryl sulfonyl chlorides of the present invention may be butyl naphthalene sulfonyl chloride, amyl naphthalene sulfonyl chloride, amyl benzene sulfonyl chloride, cyclohexylbenzene sulfonyl chloride, amyl diphenyl sulfonyl chloride, decyl benzene sulfonyl chloride, laurophenone sulfonyl chloride, dodecyl phenol sulfonyl chloride, decyl ether of decyl phenol sulfonyl chloride, and the like.

According to the process of the present invention a high molecular weight hydrolytic product of a protein is prepared by heating a protein with an aqueous alkali until a clear solution is obtained. The aqueous alkaline solution is mixed with an alkaryl sulfonyl chloride, as above defined, and the mixture is heated to boiling for from 5 to 30 minutes, whereby reaction occurs between the protein and the alkaryl sulfonyl chloride to form a wetting agent in aqueous solution.

The following examples illustrate the products and process of the present invention. All proportions are in parts by weight.

Example 1.—A mixture of 1 part of blood albumin and 5 parts of 15% NaOH solution was boiled for 10 minutes. The resulting clear, dark-red solution was cooled to 20° C. and treated, with stirring, with 1 part of a mixture of amyl naphthalene sulfonyl chlorides (obtained by treating 1 mole of monoamyl naphthalene with 2 moles of chlorosulfonic acid). The mixture was stirred until the initial reaction subsided and was then boiled for 10 minutes. A dark, viscous liquid was obtained which dissolved readily in water to give a solution with detergent properties.

Example 2.—A mixture of 1 part of zein and 5 parts of 15% NaOH solution was boiled for 5 minutes to give a clear, dark-red solution. After cooling to room temperature, 1 part of amyl naphthalene sulfonyl chloride was added to the mixture. When the heat of the reaction had subsided the product was boiled for 15 minutes during which time a further addition of 2 parts of water was made. A good foaming solution was obtained when a sample of the product was placed in water.

In the next example toulene sulfonyl chloride is used and illustrates the results when the side-chain is too short.

Example 3.—A mixture of 1 part of blood albumin and 5 parts of 15% NaOH solution was boiled for 10 minutes. The resulting clear, dark-red solution was cooled to 20° C. and treated with stirring with 1 part of paratoluene sulfonyl chloride. After the initial reaction subsided the mixture was boiled for 10 minutes. A cooled sample of the material was placed in water. A solution was obtained with little or no foaming properties.

In the next examples benzene sulfonyl chlorides substituted in the ring with long aliphatic side-chains are used.

Example 4.—A mixture of 1 part of zein and 5 parts of 15% NaOH solution was boiled for 5 minutes. The solution was cooled to room temperature and to the cooled solution was added 1 part of a sulfonyl chloride obtained by the action of phosphorus pentachloride on the sodium salt of diisobutyl phenol sulfonic acid. The mixture was boiled for 10 minutes. A good foaming product was obtained.

*Example 5.*—1 part of silk waste and 5 parts of 15% NaOH solution were boiled for 30 minutes. After cooling the product was mixed with 1 part of tertiary amyl amyloxybenzene sulfonyl chloride. The mixture was then boiled for 5 minutes. A sample was placed in water and found to disperse well and showed good foaming properties.

We claim:

1. The process of making an aqueous solution of a wetting agent which comprises mixing an alkaline solution of a high molecular weight alkali-hydrolysis product of a protein with an alkaryl sulfonyl chloride having an alkyl group of more than 3 carbon atoms attached to the aromatic nucleus, and heating the mixture at boiling for from 5 to 30 minutes to form a reaction product between the protein and alkaryl sulfonyl chloride.

2. The process of making an aqueous solution of a wetting agent which comprises mixing an alkaline solution of partially hydrolyzed zein with an alkaryl sulfonyl chloride having an alkyl group of more than 3 carbon atoms attached to the aromatic nucleus, and heating the mixture at boiling for from 5 to 30 minutes to form a reaction product between the partially hydrolyzed zein and alkaryl sulfonyl chloride.

3. The process of making an aqueous solution of a wetting agent which comprises mixing an alkaline solution of partially hydrolyzed blood albumin with an alkaryl sulfonyl chloride having an alkyl group of more than 3 carbon atoms attached to the aromatic nucleus, and heating the mixture at boiling for from 5 to 30 minutes to form a reaction product between the partially hydrolyzed blood albumin and alkaryl sulfonyl chloride.

4. The process of making an aqueous solution of a wetting agent which comprises mixing an alkaline solution of partially hydrolyzed silk with an alkaryl sulfonyl chloride having an alkyl group of more than 3 carbon atoms attached to the aromatic nucleus, and heating the mixture at boiling for from 5 to 30 minutes to form a reaction product between the partially hydrolyzed silk protein and alkaryl sulfonyl chloride.

5. A wetting agent comprising an aqueous solution of the reaction product of a high molecular weight alkali-hydrolysis product of a protein in aqueous alkaline solution with an alkaryl sulfonyl chloride having an alkyl group of more than 3 carbon atoms attached to the aromatic nucleus.

JOHN B. RUST.
LEONARD SPIALTER.